United States Patent [19]

La Rue

[11] Patent Number: 5,748,840
[45] Date of Patent: *May 5, 1998

[54] METHODS AND APPARATUS FOR IMPROVING THE RELIABILITY OF RECOGNIZING WORDS IN A LARGE DATABASE WHEN THE WORDS ARE SPELLED OR SPOKEN

[75] Inventor: Charles La Rue, La Canada, Calif.

[73] Assignee: Audio Navigation Systems, Inc., Van Nuys, Calif.

[*] Notice: The term of this patent shall not extend beyond the expiration date of Pat. No. 5,454,062.

[21] Appl. No.: 437,057

[22] Filed: May 9, 1995

Related U.S. Application Data

[63] Continuation-in-part of Ser. No. 999,062, Dec. 31, 1992, Pat. No. 5,454,062, which is a continuation-in-part of Ser. No. 675,632, Mar. 27, 1991, Pat. No. 5,274,560, which is a continuation-in-part of Ser. No. 621,577, Dec. 3, 1990, abandoned.

[51] Int. Cl.$^6$ .................................................. G10L 9/00
[52] U.S. Cl. ................................. 395/2.63; 395/2.6
[58] Field of Search .................................. 395/2.6, 2.63, 395/2, 2.4, 2.48, 2.84, 2.09, 2.64; 381/29–47

[56] References Cited

U.S. PATENT DOCUMENTS

| | | | |
|---|---|---|---|
| Re. 32,012 | 10/1985 | Pirz et al. | 395/2.84 |
| 4,242,731 | 12/1980 | Mizote et al. | 364/426 |
| 4,277,644 | 7/1981 | Levinson et al. | 395/2.5 |
| 4,301,506 | 11/1981 | Turco | 364/436 |
| 4,489,435 | 12/1984 | Moshier | 395/2.63 |
| 4,502,123 | 2/1985 | Minami et al. | 364/424 |

(List continued on next page.)

FOREIGN PATENT DOCUMENTS

| | | | |
|---|---|---|---|
| A0372840 | 6/1990 | European Pat. Off. | G01L 9/00 |
| A3719017 | 12/1988 | Germany | G01L 9/00 |

(List continued on next page.)

OTHER PUBLICATIONS

U.S. application serial No. 08/399,931, filed Mar. 6, 1995.
U.S. application serial No. 07/999,062, filed Dec. 31, 1992.

(List continued on next page.)

*Primary Examiner*—Allen R. MacDonald
*Assistant Examiner*—Richemond Dorvil
*Attorney, Agent, or Firm*—Loeb & Loeb LLP

[57] ABSTRACT

A method and apparatus for identifying any one of a plurality of words, each word having an audible form represented by a sequence of spoken speech elements, with each speech element having a respective position in the sequence, which involves: receiving spoken speech elements of a word and interpreting each received speech element, wherein each spoken speech element $\alpha$ may be interpreted as any one of a plurality of different speech elements $\beta$, one of the speech elements $\beta$ being the same as speech element $\alpha$; assigning to each of the possible speech elements a respective plurality of probabilities, $P_{\alpha\beta}$, that the speech element will be interpreted as a speech element $\beta$ when a speech element $\alpha$ has been spoken; storing data representing each word, the data for each word including identification of each speech element in the word and identification of the respective position of each speech element in the sequence of speech elements representing the word; receiving a sequence of speech elements spoken by a person and representing one of the stored words, and interpreting each speech element of the spoken word and the position of each speech element in the sequence of spoken speech elements; and comparing the interpreted speech elements with stored data representing each word of the plurality of words and performing a computation, using the probability, $P_{\alpha\beta}$, associated with each interpreted speech element $\beta$ to identify the word whose speech elements correspond most closely to interpreted speech elements.

12 Claims, 3 Drawing Sheets

U.S. PATENT DOCUMENTS

| | | | |
|---|---|---|---|
| 4,570,227 | 2/1986 | Tachi et al. | 364/444 |
| 4,630,209 | 12/1986 | Saito et al. | 364/444 |
| 4,677,429 | 6/1987 | Glotzbach | 340/711 |
| 4,679,147 | 7/1987 | Taujii et al. | 364/449 |
| 4,758,959 | 7/1988 | Thoone et al. | 364/454 |
| 4,761,815 | 8/1988 | Hitchcock | 395/2.64 |
| 4,796,189 | 1/1989 | Nakayama et al. | 364/449 |
| 4,797,924 | 1/1989 | Schnars et al. | 381/43 |
| 4,812,845 | 3/1989 | Yamada et al. | 340/995 |
| 4,827,520 | 5/1989 | Zeinstra | 381/43 |
| 4,829,578 | 5/1989 | Roberts | 381/46 |
| 4,866,778 | 9/1989 | Baker | 395/2.6 |
| 4,882,696 | 11/1989 | Nimura et al. | 364/449 |
| 4,907,159 | 3/1990 | Mauge et al. | 364/436 |
| 4,926,336 | 5/1990 | Yamada | 364/444 |
| 4,954,958 | 9/1990 | Savage et al. | 364/444 |
| 4,972,319 | 11/1990 | Delorme | 364/419 |
| 4,984,168 | 1/1991 | Neukrichner et al. | 364/449 |
| 4,985,924 | 1/1991 | Matsuura | 395/2.63 |
| 4,992,947 | 2/1991 | Nimura et al. | 364/444 |
| 5,041,983 | 8/1991 | Nakahara et al. | 364/449 |
| 5,089,826 | 2/1992 | Yano et al. | 342/457 |
| 5,115,399 | 5/1992 | Nimura et al. | 364/449 |
| 5,125,022 | 6/1992 | Hunt et al. | 379/88 |
| 5,126,941 | 6/1992 | Gurmu et al. | 364/424.2 |
| 5,132,684 | 7/1992 | Pecker et al. | 340/905 |
| 5,157,614 | 10/1992 | Kashiwazaki et al. | 364/443 |
| 5,170,164 | 12/1992 | Lewis | 340/988 |
| 5,170,353 | 12/1992 | Verstraete | 364/444 |
| 5,172,321 | 12/1992 | Ghaem et al. | 364/444 |
| 5,177,685 | 1/1993 | Davis et al. | 364/443 |
| 5,303,299 | 4/1994 | Hunt | 381/43 |
| 5,353,023 | 10/1994 | Mitsugi | 340/989 |
| 5,406,492 | 4/1995 | Suzuki | 364/449 |

FOREIGN PATENT DOCUMENTS

| | | | |
|---|---|---|---|
| 59-17108 | 1/1984 | Japan . | |
| 61-75212 | 4/1986 | Japan . | |
| 61-226777 | 10/1986 | Japan . | |
| 62108111 | 5/1987 | Japan . | |
| A62108111 | 5/1987 | Japan | G01L 21/00 |
| 63-259412 | 10/1988 | Japan . | |
| 63-261108 | 10/1988 | Japan . | |
| 6439597 | 3/1989 | Japan | G01L 9/00 |
| 1173820 | 7/1989 | Japan . | |
| 0269616 | 3/1990 | Japan . | |
| 02151715 | 6/1990 | Japan . | |
| 02154111 | 6/1990 | Japan . | |
| 6502488 | 3/1994 | Japan . | |
| WO9209866 | 6/1992 | WIPO | G01L 21/20 |
| WO9416437 | 7/1994 | WIPO . | |

OTHER PUBLICATIONS

U.S. application serial No. 08/110,503, filed Aug. 20, 1993.

Search report, International application serial No. PCT/US93/12690, filed Dec. 30, 1993.

SAE Technical Paper Series, vol. 870139, Warrendale, PA., 1987, M.L.G. Thoone et al.: "The Car Information and Navigation System Carin and the Use of Compact Disc Interface."

IEEE Transactions on Instrumentation and Measurement, vol. 37, No. 4, Dec. 1988, New York, US, pp. 586–590; S.S. Awad: "Voice Technology in the Instrumentation of the Automobile."

U.S. application serial No. 07/675,632, filed Mar. 27, 1991, now allowed and will be issued as U.S. patent No. 5,274,560.

"Computer Software Information Management,"; Lesk, Scientific American, vol. 251, No. 3, Sep. 1984.

METHODS AND APPARATUS FOR IMPROVING THE RELIABILITY OF RECOGNIZING WORDS IN A LARGE DATABASE WHEN THE WORDS ARE SPELLED OR SPOKEN

CROSS-REFERENCE TO RELATED APPLICATION

This application is a continuation-in-part of application Ser. No. 999,062, U.S. Pat. No. 5,454,062 filed Dec. 31, 1992, which is a continuation-in-part of application Ser. No. 675,632, filed Mar. 27, 1991, now U.S. Pat. No. 5,274,560, which is a continuation-in-part of application Ser. No. 621,577, filed Dec. 3, 1990, now abandoned. The disclosure of application Ser. No. 999,062, and the computer listings submitted therewith are incorporated herein by reference.

BACKGROUND OF THE INVENTION

It is generally recognized that man-machine interaction can be enhanced by the ability to communicate audibly, or orally. A variety of interfaces have been developed, including input devices which identify spoken words and output devices which produce synthesized speech. While significant advances have been made with regard to output devices, which respond to well-defined signals, input devices have posed more difficult problems.

Such input devices must convert spoken utterances, i.e. letters, words, or phrases, into the form of electrical signals, and must then process the electrical signals to identify the spoken utterances. By way of example: acoustic signals constituting spoken utterances may be sampled at fixed intervals; the pattern formed by a succession of sampled values may then be compared with stored patterns representing known spoken utterances; and the known spoken utterance represented by the stored pattern which matches the pattern of sampled values most closely is assumed to be the actual spoken utterance. The input devices which have already been proposed could, in theory, function with a high degree of reliability. However, in the present state of the art, they are operated by programs which entail long processing times that prevent useful results from being achieved in acceptably short time periods.

One commercially available program for recognizing spoken utterances is marketed by Lernout and Hauspie Speech Products U.S.A., Inc., of Woburn, Mass. under the product name CSR-1000 Algorithm. This company also offers a key word spotting algorithm under the product name KWS-1000 and a text-to-speech conversion algorithm under the product name TTS-1000. These algorithms are usable on conventional PCs having at least a high-performance 16 bit fixed or floating DSP processor and 128 KB of RAM memory.

The CSR-1000 algorithm is supplied with a basic vocabulary of, apparently, several hundred words each stored as a sequence of phonemes. A spoken word is sampled in order to derive a sequence of phonemes. The exact manner in which such sequence of phonemes is processed to identify the spoken word has not been disclosed by the publisher of the program, but it is believed that this is achieved by comparing the sequence of phonemes derived from the spoken word with the sequence of phonemes of each stored word. This processing procedure is time consuming, which probably explains why the algorithm employs a vocabulary of only several hundred words.

It would appear that the CSR-1000 algorithm could be readily configured to recognize individual spoken letters.

Speech recognition of large isolated word vocabularies of 30,000 words or more requires that the utterances be broken into phonemes or other articulatory events or, alternatively, that the user verbally spell the word, in which case, his utterances of the letters of the alphabet are recognized by their phoneme content and then the sequence of letters is used to identify the unknown word. In any large vocabulary system, both methods are needed to insure accuracy. The user would first attempt to have the word recognized by simply saying the word. If this was unsuccessful, the user would then have the option of spelling the word.

A problem occurs with spelling, however, because the English alphabet is not easily recognized by speech recognition system. For example, almost all recognizers have trouble distinguishing the letter "B" from the letter "P", the letter "J" from "K", the letter "S" from the letter "F" and so on. In fact, most of the alphabet consists of single syllable utterances which rhyme with some other utterance, or which, although not rhyming, can be confused with some other utterance. An example of the latter would be any pair of the letters "F", "X", "S" and "M", all of which have the same initial sound. Similarly, many phonemes which sound alike can be mis-recognized. Hereinafter, references to letters or phonemes which sound alike are meant to include those which rhyme and those which can otherwise be confused with one another. Clearly, it is necessary for a speech recognition system to deal with the errors caused by letters or phonemes which sound alike.

Application Ser. No. 999,062, (hereinafter referred to as the prior application) discloses a method for identifying any one of a plurality of utterances using a programmed digital computing system, each utterance having an audible form representable by a sequence of speech elements, and each speech element having a respective position in the sequence, the method comprising: storing, in the computer system, a digital representation corresponding to each of the plurality of utterances and assigning a respective identifying designation to each utterance; creating a table composed of a plurality of entries, each entry being associated with a unique combination of a particular speech element and a particular position in the sequence of speech elements of the audible form of an utterance and storing in each entry the identifying designation of each of the plurality of utterances whose audible form is represented by a speech element sequence containing the particular speech element at the particular position with which that entry is associated; converting an utterance to be identified and spoken by a person into a sequence of speech elements each having a respective position in the sequence; reading at least each table entry associated with a speech element and position combination corresponding to the combination of a respective position in the sequence of the spoken utterance and the particular speech element at the respective position in the sequence of the spoken utterance; and determining which identifying designation appears most frequently in the entries which have been read in the reading step.

To implement that method, a collection of words to be recognized, i.e. the "vocabulary" of the system, are stored in a first database, with each word being assigned an identifying designation, e.g. an identifying number.

As a practical matter, every spoken word is made up of a string of phonemes, or articulatory events, which occur in a specific sequence. A few words and a number of letters such as "e" and "o" may consist of a single phoneme which may be recognized by a system according to the invention. Letters will typically consist of one or two phonemes and may be recognized by a system according to the invention.

A spoken language appears to consist of a defined number of distinct phonemes, each of which is identifiable by a specific symbol. It is generally considered that English-language words contain 50-60 different phonemes and in the description of the present invention, each phoneme is assigned a respective numerical value.

Different speakers of a language may pronounce a word differently so that a given word may be composed of phoneme strings which differ from one another. To minimize recognition errors resulting from such speech variations, it is known to have a selected word spoken by a number of different speakers, determine the phoneme string for the word spoken by each speaker, and derive a mean or average phoneme value for each word portion for which the speakers produced a number of different phonemes.

In the method described above, account is taken of possible errors in the interpretation, or recognition, of individual letters or phonemes by giving a high score to each word having, in the same position in the sequence of letters or phonemes, the same letter or phoneme as that interpreted, or recognized, and a lower score for a word or phoneme which sounds like the interpreted one. The relative score values are selected empirically or intuitively and will not change after the system has been programmed and placed into use. Therefore, the word recognition success rate will vary from one user to another, depending on the degree to which the speech characteristics, i.e. pronunciation, accent, etc., of the user conforms to those programmed into the interpreter.

SUMMARY OF THE INVENTION

It is an object of the present invention to provide certain improvements in the method disclosed in the prior application and in systems for implementing that method.

A more specific object of the invention is to improve the reliability of word recognition in comparison with the method disclosed in the prior application.

Another object of the invention is to permit automatic adaptation of the word recognition procedure to individual users.

The above and other objects are achieved, according to the present invention, by a method and apparatus for identifying any one of a plurality of words using a programmed digital data processing system, each word having an audible form represented by a sequence of spoken speech elements, with each speech element having a respective position in the sequence, the digital data processing system being connected to means for receiving spoken speech elements of a word and interpreting each received speech element, wherein there is a plurality of possible speech elements, each spoken speech element is a speech element $\alpha$, each interpreted speech element is a speech element $\beta$, and each spoken speech element $\alpha$ may be interpreted as any one of a plurality of different speech elements $\beta$, one of the speech elements $\beta$ being the same as speech element $\alpha$, word identification being achieved by:

assigning to each of the possible speech elements a respective plurality of probabilities, $P_{\alpha\beta}$, that the speech element will be interpreted as a speech element $\beta$ when a speech element $\alpha$ has been spoken;

storing data representing each word of the plurality of words, the data for each word including identification of each speech element in the word and identification of the respective position of each speech element in the sequence of speech elements representing the word;

in the means for receiving and interpreting, receiving a sequence of speech elements spoken by a person and representing one of the stored words, and interpreting each speech element of the spoken word and the position of each speech element in the sequence of spoken speech elements; and comparing the interpreted speech elements with stored data representing each word of the plurality of words and performing a computation, using the probability, $P_{\alpha\beta}$, associated with each interpreted speech element $\beta$ to identify the word of the plurality of words whose speech elements correspond most closely to interpreted speech elements.

REFERENCE TO APPENDIX

Attached hereto and made a part of the present specification, is an APPENDIX listing one example of a program which may be used in the practice of the invention. This program can be readily supplemented by an average programmer to deal with letters that sound alike but do not rhyme.

DESCRIPTION OF THE PREFERRED EMBODIMENTS

Figure 1:
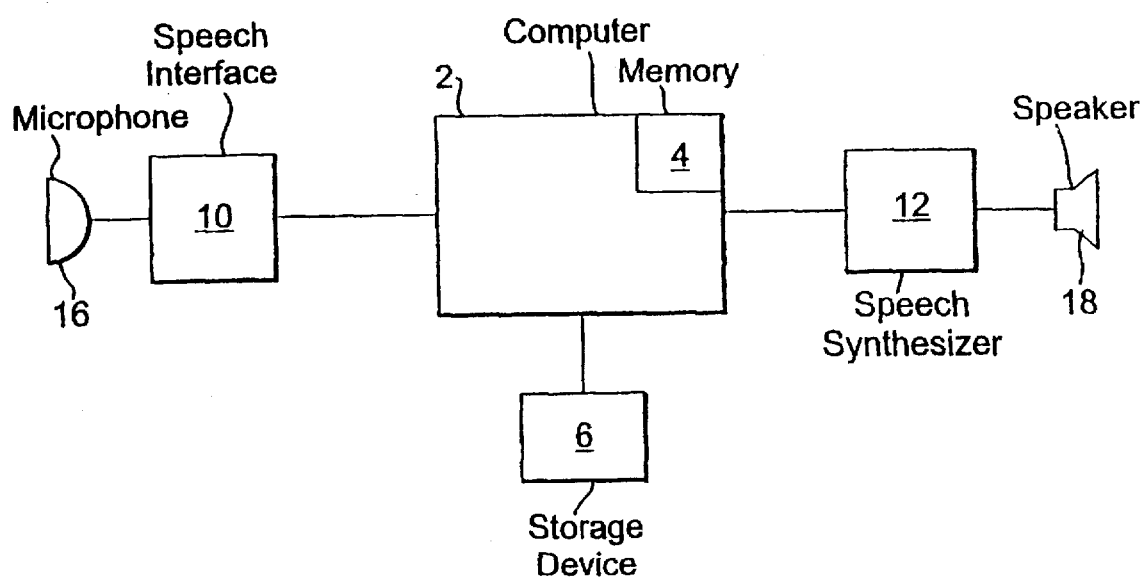
FIG. 1 is a block diagram of a system for practicing the present invention.

FIG. 1 is a block diagram illustrating a system which can be employed to implement the present invention. The heart of the system is a conventional, general purpose computer 2, such as a PC containing a RAM memory 4 having a capacity of at least 200 KB. Computer 2 is equipped, in the usual manner, with a keyboard, a monitor and means for connecting computer 2 to peripheral components.

Associated with computer 2 is a storage device 6, which may be installed within computer 2. Storage device 6 may be a hard disk, a floppy disk, a ROM, a PROM, an EPROM, an EEPROM, a flash memory, an optical disk, etc. One possibility is to constitute storage device 6 as an optical disk or compact disk player which could form part of a separate audio system installed, for example, in an automobile.

Connected to computer 2 are peripheral devices including a speech interface unit 10 and a speech synthesizer 12. Input to speech interface unit 10 is provided by a microphone 16, while the output from speech synthesizer 12 is delivered to a speaker 18. If storage device 6 is constituted by a disk player in an audio system, speaker 18 may be constituted by the speaker or speakers of that audio system.

The storage medium of storage device 6 contains the operating program for recognizing spoken utterances, along with a first database containing representations of the utterances to be recognized and an associated identifying designation for each stored utterance and a second database in the form of a table composed of a plurality of entries. The identifying designations provided in the first database are stored in appropriate entries of the table constituting the second database in a manner which will be described in greater detail below.

Speech synthesizer 12 and speaker 18 are connected to generate and emit spoken utterances constituting prompts for the user of the system and the recognized versions of utterances spoken by the user.

The storage medium may be of a type, such as an optical disk, which can store the utterances in a form that can be directly reproduced, possibly via an amplifier and/or a digital/analog converter. In these cases, speech synthesizer 12 can be replaced by such components.

The basic operation of the system is as follows. At the start of operation, the portions of the operating program which must be resident in memory 4 are loaded therein from storage device 6. The operating program portion loaded into memory 4 may include that program portion which serves to convert spoken utterances into sequences of phonemes, which is a capability of the CSR-1000 algorithm referred to earlier herein. Then, an utterance spoken by a user of the system is picked up by microphone 16 and converted into an electrical analog signal which is delivered to interface 10. Depending on the program employed to derive sequences of phonemes, interface 10 may place the analog signal at a suitable voltage level and conduct it to computer 2, or may convert the analog signal into the form of digital samples. The spoken utterance is converted into a sequence of phonemes and this sequence is processed, according to the invention in order to identify the stored utterance which corresponds to the spoken utterance. Then, a sequence of phonemes associated with that stored utterance is conducted to speech synthesizer 12 and emitted in audible form by speaker 18 to allow the user to verify that the spoken utterance was correctly recognized. The computer may then, under control of its operating program, generate further audible utterances which may be prompts to the user to input a further spoken utterance containing certain information or may be output information derived from the information previously supplied in spoken form by the user.

According to alternative embodiments of the invention, the spoken utterances are letters which spell a word. In this case, the identity of each letter is determined by matching its phoneme or phonemes with stored patterns and the resulting sequence of letters constitutes the sequence of speech elements which are processed to identify the correct stored utterance.

Furthermore, embodiments of the invention need not reproduce a stored utterance in audible, or any other, form. Instead, the stored utterances may constitute machine instructions which correspond to respective spoken utterances and which act to cause a machine to perform a desired operation.

To cite one non-limiting example, the technique disclosed herein may be employed in a navigation system of the type disclosed in the above-cited application Ser. No. 675,632, in which case the user will be prompted to supply, in spoken form, identification of starting and destination points and will then be provided with a series of route directions. If the spoken information supplied by the user is in the form of spellings of starting and destination locations, the system may prompt the user to input each successive letter.

The invention will be described with respect to a generalized embodiment in which a first database contains data identifying words, with each word being assigned an identifying number. The standard, or average, phoneme string associated with the spoken version of each word is determined by conventional procedures. Each phoneme in a string is located at a respective position, n, and each distinct phoneme is assigned a value m.

The structure of this first database is illustrated by TABLE 1, below, which represents a large vocabulary database containing K words in which, for each word, there is provided a respective identifying number (id#) and data representing a letter and/or phoneme sequence which can be used for displaying and/or sounding the word for verification and/or for locating information about the word in connection with a specific application.

TABLE 1

| id # | Word letter sequence | Word phoneme sequence |
|---|---|---|
| 1 | . | . |
| 2 | . | . |
| . | . | . |
| 101 | ALABAMA | a-l-a-b-a-m-a |
| 102 | ARIZONA | a-r-i-z-o-n-a |
| 103 | BRAZIL | b-r-a-z-i-l |
| 104 | CHICAGO | c-h-i-c-a-g-o |
| 105 | SEATTLE | s-e-a-t-t-l-e |
| 106 | ATLANTA | a-t-l-a-n-t-a |
| 107 | ARICONE | a-r-i-c-o-n-e |
| . | . | . |
| K | . | . |

Then a second database is prepared as shown herebelow in TABLE 2, which shows a large vocabulary database containing subsets (n,m) of identifying numbers from the first database for words having the phoneme or letter m at position n of the phoneme or letter string.

TABLE 2

| | n→ 1 | 2 | 3 | 4 | ... | N |
|---|---|---|---|---|---|---|
| m 1 ↓ | {1,1} | {2,1} | {3,1} | {4,1} | ... | {N,1} |
| 2 | {1,2} | {2,2} | {3,2} | {4,2} | ... | {N,2} |
| . | . | . | . | . | | . |
| M−1 | {1,M−1} | {2,M−1} | {3,M−1} | {4,M−1} | ... | {N,M−1} |
| M | {1,M} | {2,M} | {3,M} | {4,M} | ... | {N,M} |

Each entry in the second database is a subset (represented by {n,m}) containing the identifying numbers of all words in the first database for which phoneme or letter position n contains phoneme or letter m.

In TABLE 2, the total number of phoneme or letter positions in a string is a maximum of N and the total number of different phonemes or letters is M. The value of N is selected to assure that essentially all phonemes or letters of each word can be accounted for. Below, for the sake of brevity, reference will be made to phonemes. It should be understood, however, that as a general rule reference to letters would be equally appropriate.

The system is further provided with a scoring memory, or table, containing a number of locations equal to the number of words in the first database; each location is associated with a respective word identifying number.

A spoken word is analyzed in order to derive its characteristic phoneme string. The string will have N or fewer phonemes and each phoneme can have any one of M different values.

The phoneme value, m, of the spoken word at the first location in the string (n=1) is identified and for each member of the subset {1, m}, a score is placed in every scoring memory location associated with an identifying number in subset {1, m}. Then the phoneme value, m, of the spoken word at the second location in the string {n=2} is identified and, as above, for each member of the subset {2, m}, a score is placed in every scoring memory location associated with an identifying number in subset {2, m}. This score will be added to any score previously placed in any of the scoring locations associated with an identifying number in subset {2, m}.

This procedure continues for the entire phoneme string of the spoken word, or for a string of N phonemes, where N may be larger or smaller than the number of phonemes in the string of the spoken word. After the phoneme string has been processed, the scoring memory is interrogated and the word whose identifying number corresponds to that of the scoring memory location which has the highest score is determined to be the spoken word.

It has been found that this procedure will yield the correct word a surprisingly high percentage of the time.

Then, the stored data is read from the location of the first database which has the corresponding identifying number. The stored data can be used to reproduce the word in spoken form, as described above.

The system will then await a spoken response from the user.

In order to reduce the frequency of recognition errors, a system according to the present invention may select, from the scoring table, the utterance designations for the utterances which received the three highest scores, these designations being delivered in descending order of the scores. The stored utterance associated with each selected identifying designation is then delivered to speech synthesizer 12 and emitted in spoken form from speaker 18. After each synthesized utterance is emitted, the system waits for a response from the user, e.g. either "yes" or "no". If the user responds with a "no" after each synthesized utterance is heard, it is concluded that the recognition process failed, the scoring memory is cleared, and the user is prompted, if necessary, to repeat the spoken utterance. It is anticipated that such failures will be extremely rare.

The storage of utterance identifying designations in the form of a table, as described above, represents a substantial improvement over the prior art because it results in a substantial reduction in the amount of data which must be processed in order to arrive at an identification of the spoken utterance. Specifically, for each position in the sequence of speech elements of a spoken utterance, it is only necessary to access the table entry associated with that speech element position and the particular speech element at that position of the spoken utterance. In other words, to correctly identify the spoken utterance, it is not necessary to access all of the entries in the table.

In TABLE 2, the speech elements represented by m may either be phonemes or letters of the alphabet. Correspondingly, the speech element positions represented by n will be either the positions of phonemes in a sequence or the positions of letters in a word, respectively.

The speech recognition procedure, as described thus far, is implemented by reading only one entry of the second database table for each speech element position (n). However, it has been found that when each spoken utterance is a word which is converted into a string of phonemes, the speaker may pronounce the word in such a manner as to add or delete one or two phonemes. If this should occur, the spoken word will not be correctly recognized. According to a further feature of the invention, the probability of achieving correct recognition is increased by taking into account the entries associated with a particular phoneme which are immediately adjacent that entry associated with the correct position n. For example, referring to TABLE 2 above, if the phoneme at position n=3 of the spoken word is being compared with the stored data, and the value of this phoneme is 2, the identifying numbers in at least subsets {2, 2} and {4, 2} will additionally be used to include a score in the scoring memory. Subsets {1, 2} and {5, 2} can additionally be used in the same manner. Although it might, on first consideration, appear that this would reduce the probability of achieving correct recognition, it has, surprisingly, been found that quite the opposite is true and that this stratagem will, in fact, increase the probability of correct recognition.

In addition, account may be taken of the fact that phonemes which sound alike can be misunderstood by the device or program which interprets each spoken phoneme. In order to minimize errors resulting from such incorrect identification of individual phonemes, all of the entries associated with a given phoneme position (n) and with a phoneme (m) which rhymes with the phoneme that the system determined to have been spoken are also read and a score is placed in the scoring table for each identifying number which has been read.

If the spoken word is inputted by spelling that word, then the speech elements will be letters, i.e. alphabetic characters, and the sequence of speech elements will be a sequence of letters in which each letter occupies a particular position. A simplified example of this implementation will be presented below, using the words having id# 101–107 of TABLE 1.

In TABLE 3 below, the distribution of identifying numbers in the second database is illustrated. Thus, if the first letter of the spoken word is the letter "A", it is only necessary to interrogate the subset {1,A} of TABLE 3, and so on for the remaining letters. It will be noted that, for the sake of simplicity, it has been assumed that each word has a maximum of seven letters. However, the second database can be established to identify words having any selected maximum number of letters.

TABLE 3

| m ↓ | n → 1 | 2 | 3 | 4 | 5 | 6 | 7 |
|---|---|---|---|---|---|---|---|
| A | 101 |  | 101 | 106 | 101 |  | 101 |
|  | 102 |  | 103 |  | 104 |  | 102 |
|  | 106 |  | 105 |  |  |  | 106 |
|  | 107 |  |  |  |  |  |  |
| B | 103 |  |  | 101 |  |  |  |
| C | 104 |  |  | 104 |  |  |  |
|  |  |  |  | 107 |  |  |  |
| D |  |  |  |  |  |  |  |
| E |  | 105 |  |  |  |  | 105 |
|  |  |  |  |  |  |  | 107 |
| F |  |  |  |  |  |  |  |
| G |  |  |  |  |  | 104 |  |
| H |  | 104 |  |  |  |  |  |
| I |  |  | 102 |  | 103 |  |  |
|  |  |  | 104 |  |  |  |  |
|  |  |  | 107 |  |  |  |  |
| . | . | . | . | . | . | . | . |
| . | . | . | . | . | . | . | . |
| . | . | . | . | . | . | . | . |
| L |  | 101 | 106 |  |  | 103 |  |
|  |  |  |  |  |  | 105 |  |
| M |  |  |  |  |  | 101 |  |
| N |  |  |  |  | 106 | 102 |  |
|  |  |  |  |  |  | 107 |  |
| O |  |  |  |  | 102 |  | 104 |
|  |  |  |  |  | 107 |  |  |
| . | . | . | . | . | . | . | . |
| . | . | . | . | . | . | . | . |
| . | . | . | . | . | . | . | . |
| R |  | 102 |  |  |  |  |  |
|  |  | 103 |  |  |  |  |  |
|  |  | 107 |  |  |  |  |  |
| S | 105 |  |  |  |  |  |  |

TABLE 3-continued

| m ↓ | n → 1 | 2 | 3 | 4 | 5 | 6 | 7 |
|---|---|---|---|---|---|---|---|
| T | | 106 | | 105 | 105 | 106 | |
| . | . | . | . | . | . | . | . |
| . | . | . | . | . | . | . | . |
| Z | | | | 102 | | | |
|   | | | | 103 | | | |

In the example illustrated in TABLE 3, it has again been assumed that only one subset (n,m) is addressed for each letter of the spoken word. However, it has been found that the probability of correct recognition of a word which has been inputted in the form of spelling can be enhanced by applying two stratagems.

Firstly, it may occur not infrequently that when one spells a word, a letter will be omitted or added. In this case, if only the subset contained in one entry of the second database is read for each letter of the word to be identified, the probability of correct identification is reduced. According to the first stratagem relating to this implementation, for a given letter position in the word to be interrogated, the entries to either side of the correct entry are also read and a score is placed in the scoring memory for each of those entries. Thus, if what is believed to be the fourth letter of the spoken word is being considered, and the letter is "A", not only will subset {4, A} be read, but also subsets {3, A} and {5, A}.

According to the second stratagem, account is taken of the fact that letters which sound alike can be misunderstood by the device or program which interprets each spoken letter. For example, "AA" can easily be confused with "K" and "B" can be confused with "C", "D", "E", etc. In order to minimize errors resulting from such incorrect identification of individual letters, all of the entries associated with a given letter position (n) and with a letter (m) which rhymes with the letter that the system determined to have been spoken are also read and a score is placed in the scoring table for each identifying number which has been read.

Although, here again, it may, on first consideration, appear that these stratagems would reduce the probability of correct identification of a spoken word which has been inputted by spelling, it has, surprisingly, been found that quite the opposite it true. The scores appearing in the scoring memory for those letters which were incorrectly interpreted will invariably be lower than the score for the correct word.

A scoring memory may be conceptualized as having a structure as shown below in TABLE 4 in which a score is accumulate for each word on the basis of the number of times the id# for that word was read in TABLE 2 or 3 according to one of the procedures described above.

TABLE 4

| id # | Score |
|---|---|
| 1 | Accumulated score for word 1 |
| 2 | Accumulated score for word 2 |
| . | . |
| . | . |
| . | . |
| K | Accumulated score for word K |

For scoring purposes, each time a particular id# is found in an entry of the second database, this constitutes a scoring "hit" for that id#. Depending on the stratagem employed, i.e. taking into account rhyming phonemes or letters or the addition or deletion of one letter or one or two phonemes in the spoken word to be identified, several entries may be read for each speech element position of the word to be identified. In this case, each "hit" may be weighted on the basis of various factors.

By way of example, the following scoring scheme may be employed when the second database is explored, or read, for evaluating each speech element position of the spoken word to be identified.

For each id# in an entry at row n which exactly matches the associated letter or phoneme of the spoken word, a weight of 10 is assigned; for each id in an entry at a row associated with a letter or phoneme which rhymes with that at row m, a weight of 6 is assigned. This will apply for id#s in the column n associated with the particular spoken word speech element position and in each other column of the second database (n±1,2) which is read to take account of letter or phoneme additions or deletion when the word was spoken. For each such id#, a hit value of 1 is assigned;

Then, for each hit in the column n corresponding exactly to the spoken word speech element position, a hit value of 1 is added to the previous hit value;

If an id# is in the row m which exactly matches the associated letter or phoneme of the spoken word (and, the same id# was in the row which exactly matched the associated letter or phoneme of the spoken word) for the immediately preceding speech element position of the spoken word, a further hit value of 1 is added to the previous hit value;

then the total hit value is multiplied by the weight and is divided by the number of speech elements, i.e. letters or phonemes, in the spoken word. This division assures that longer words will not get higher scores just because of their length;

The resulting score is placed in the scoring memory for each id#.

Finally, for each id# whose stored word whose letter of phoneme string has a length exactly equal to that of the spoken word, an additional score, which may equal 10 is added to the scoring memory.

After all speech element positions of the spoken word have thus been compared with the stored data, the scoring memory locations containing scores can be sorted in descending order of scores and the id#s associated with the three highest scores are outputted.

It will thus be seen that the data processing sequence described above is relatively simple. After a spoken word has been processed by known techniques to derive a letter or phoneme string, or sequence, the letter or phoneme at each position of the string is used as a reference to determine which entries of the second database are read, scores are accumulated in the scoring memory, and after all positions of the spoken word string have been considered, the scoring memory is sorted.

According to the present invention, each stored word is scored with respect to each recognized, or interpreted, speech element, e.g. letter or phoneme, in a manner generally similar to that described above, but with relative scores based on a determination of interpretation probabilities. Thus, for each position in the letter or phoneme sequence, each stored word is scored on the basis of the identity of the interpreted letter or phoneme and the probability that the letter or phoneme in that stored word was actually spoken.

In further accordance with the present invention, the probability values are updated while the word recognition system is in use, to adapt to inherent imperfections in the interpreter and speech characteristics of the user.

Figure 3:
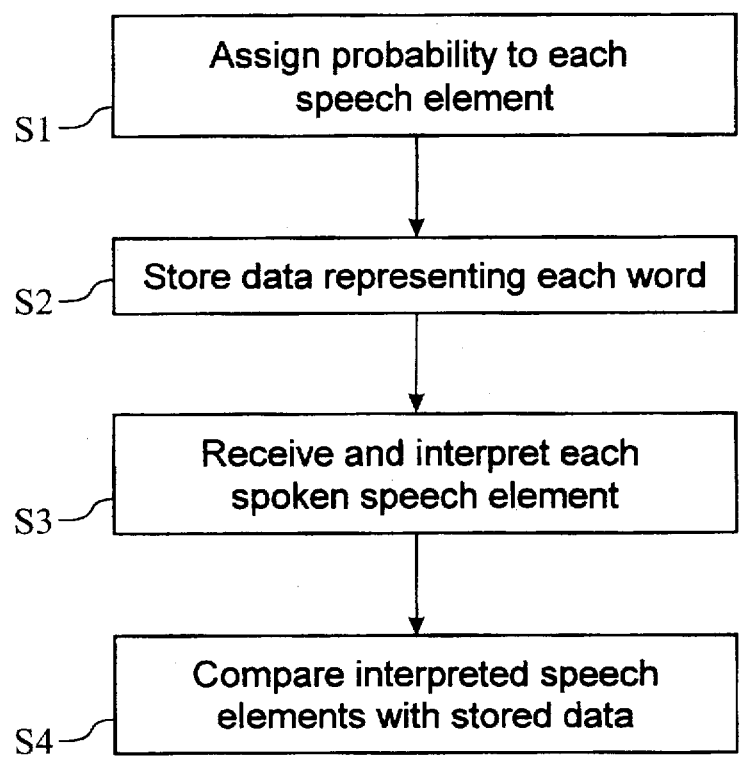
FIG. 3 is a diagram illustrating the steps of a word identification method according to the present invention.

In preferred embodiments of this invention, as shown in FIG. 3, in step S1, each possible combination of a spoken speech element, α, and a recognized, or interpreted, speech element, β, is assigned a probability, $P_{\alpha\beta}$. This is the probability that a speech element has been interpreted as a speech element β when a speech element α was spoken. In step S2, data representing each word of the plurality of words is stored, and in step S3, a sequence of spoken speech elements is received and each speech element and its position in the sequence of spoken speech elements is interpreted. Then, in step S4, the interpreted speech elements are compared with stored data representing each word, this comparison including performing a computation to identify the word or the plurality of words whose speech elements correspond most closely to interpreted speech elements. For each position in a speech element sequence, when a spoken speech element is interpreted as element β, then each stored word is given a score corresponding to the specific probability, $P_{\alpha\beta}$, assigned to the combination of the interpreted element β and the actual speech element α in the same position in the sequence representing that word. Then, for each stored word, the scores for all positions are summed and the word with the highest total score is identified as the spoken word.

According to an alternative approach, scores may be initially summed for all stored words for the first several sequence positions and subsequently scoring may continue for only a selected number of stored words which had the highest scores during initial summing for the first several sequence positions.

The probabilities, $P_{\alpha\beta}$, used in the practice of the present invention may be obtained, by way of example, as follows:

several different speakers pronounce each letter of the alphabet, each speaker pronouncing all letters one or several times;

each pronounced letter is received by the receiver and interpreted by the interpreter;

a count is obtained of each time a spoken letter α was interpreted as a letter β, where each of α and β may be any letter from A to Z and α may be the same as or different from β, and for each combination α, β, the probability, $P_{\alpha\beta}$, is obtained by dividing the number of times, $N_{\alpha\beta}$, that element α was interpreted as element β by the total number of times, $\Sigma N_\beta$, that spoken elements were interpreted as element β.

The following Table illustrates some of the data collected during a theoretical performance of the above procedure:

TABLE

| α\β → ↓ | A | C | D | F | U |
|---|---|---|---|---|---|
| A | 89 | — | 0 | 0 | — | 1 | — | 0 |
| B | 1 | 5 | 3 | 0 | 0 |
| C | 1 | 51 | 0 | 0 | 0 |
| D | 0 | 11 | 5 | 1 | 0 |
| E | 1 | 4 | 4 | 0 | 0 |
| L | 0 | 0 | 0 | 1 | 0 |
| P | 1 | 2 | 2 | 0 | 0 |
| R | 0 | 0 | 0 | 1 | 0 |
| S | 1 | 0 | 0 | 36 | 1 |
| U | 0 | 0 | 0 | 0 | 111 |
| $\Sigma N_\beta$ | 113 | 131 | 18 | 163 | 123 |

In the Table, the values for $\Sigma N_\beta$, include counts appearing in cells which are not shown. Exemplary values for probabilities, $P_{\alpha\beta}$, computed from the above Table include, by way of example:

$$P_{AA} = \frac{89}{113} = 0.788;$$

$$P_{BD} = \frac{3}{18} = 0.176;$$

$$P_{PA} = \frac{1}{113} = 0.009.$$

The meaning of these probabilities is the following:

$P_{AA}$—the spoken letter A was interpreted as letter "A" 89 times, while it occurred 113 times that various spoken letters were interpreted as "A". When a spoken letter is interpreted as "A", the probability is 89/113=0.788 that the spoken letter was, in fact, "A";

$P_{BD}$—the spoken letter "B" was interpreted as "D" 3 times, while various spoken letters were interpreted as "D" 18 times. Therefore, when a spoken letter is interpreted as "D" the probability that the spoken letter was actually "B" is 3/18=0.167;

$P_{PA}$—by a similar analysis, when a spoken letter is interpreted as "A", the probability that the spoken letter was actually "P" is 1/113=0.009.

The data contained in the above Table will now be used to demonstrate word identification according to the invention.

Suppose that the words for which data is stored in the database include:
ABACUS
APPLES
ABSURD,
the user spells A-B-A-C-U-S, and the interpreter "hears", or interprets the spelled letters as A-D-A-C-U-F. The task to be performed according to the invention is to identify the word which was actually spelled. For this purpose, the sequence of interpreted elements is compared with the sequence of elements of each word for which data is stored in the database by retrieving the probability that when the element at each position of the sequence of interpreted elements was interpreted as element β, the spoken element α was the element of the stored word at the same position of the stored word element sequence. Then, for each stored word, all associated probabilities are summed, $\Sigma P_{\alpha\beta}$, and the stored word producing the largest sum is judged to be the word for which the elements were actually spoken.

For this example, the probabilities for each element, or letter, of each of the stored words are as follows:

$$\begin{array}{cccccc} A & B & A & C & U & S \\ .788 & .167 & .788 & .389 & .902 & .221 \end{array} = \frac{\Sigma P_{\alpha\beta}}{3.245}$$

$$\begin{array}{cccccc} A & P & P & L & E & S \\ .788 & .111 & .009 & .000 & .000 & .221 \end{array} = 1.129$$

$$\begin{array}{cccccc} A & B & S & U & R & D \\ .788 & .167 & .011 & .000 & .000 & .006 \end{array} = .972$$

Thus, the system indicates that the spoken word was ABACUS because $\Sigma P_{\alpha\beta}$ for the elements of that word is the largest.

According to a further feature of the invention, the data employed to calculate probabilities, $P_{\alpha\beta}$, is updated after each word identification process, based on the results of the process. Specifically, the identified word is assumed to be the word whose elements were spoken by the user, each element β of the interpreted word is associated with the element α in the same position in the identified word, each count in the data Table for which an α, β association exists between the elements of the interpreted word and if the identified word is incremented by one, and new values for $\Sigma N_\beta$ are computed for each column associated with an interpreted element $\beta$.

Thus, in the above example where ABACUS was identified from the interpreted word ADACUF, the count $N_{AA}$ will be incremented by 2, and $N_{BD}$, $N_{CC}$, $N_{UU}$ and $N_{SF}$ will each be incremented by 1. Correspondingly, $\Sigma N_A$ will be incremented by 2 and each of $\Sigma N_C$, $\Sigma N_D$, $\Sigma N_P$ and $\Sigma N_U$ will be incremented by 1.

This updating permits a system according to the invention to identify a spoken word with greater reliability by compensating for imperfections in the interpreter and/or speech impediments on the part of the user. For example, because of such interpreter imperfections and/or user speech impediments, the interpreter may frequently interpret a spoken letter, such as "B", as the letter "V". If this should occur, the updating procedure will change the data to gradually increase the value of $P_{BV}$. This will increase the likelihood of correctly identifying spoken words containing the letter "B". On the other hand, each time the letter "V" is correctly identified, $N_{VV}$ will be incremented. In both cases, $\Sigma N_V$ will be incremented.

Such a procedure is particularly helpful for a system which is to have a single user. If a system is to have several users, data for calculating probabilities may be separately stored for each user and the system can be provided with a selector which is operable by a user to identify that user. Based on operation of the selector, the data dedicated to that user can be employed for calculation of probabilities and can be updated after each use.

The description provided above with respect to pronounced, or spoken, letters, is equally applicable to a system in which a word itself is spoken and the speech signal is divided into phonemes. In either case, use can be made of conventional interpreters since the initial speech element determination is not a novel feature of the invention.

Figure 2:
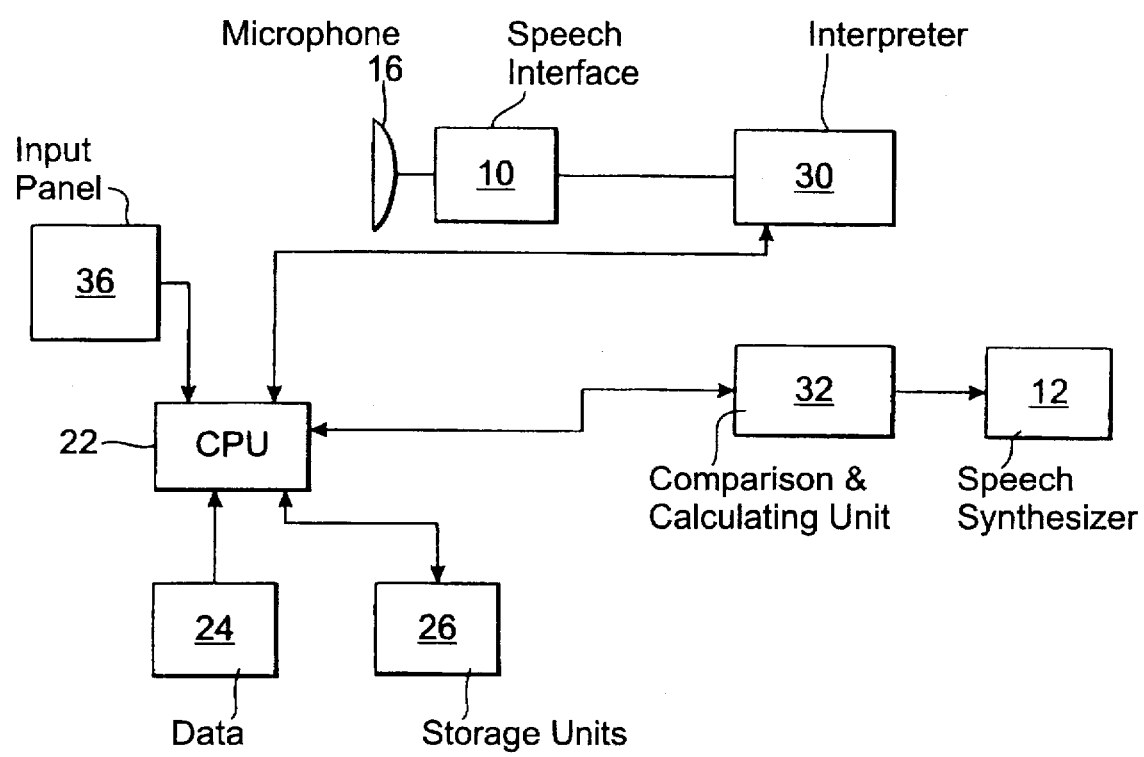
FIG. 2 is a block diagram of an embodiment of computer 2 of FIG. 1 for practicing the invention.

A system for identifying words according to the invention, which system can be implemented by a suitably programmed digital computer, is shown in FIG. 2. This system includes a CPU 22 for controlling system operation, a first data storage unit 24 storing the data representing the plurality of words, a second data storage unit 26 storing the data used to calculate the probabilities, $P_{\alpha\beta}$, speech interface 10 for receiving spoken speech and converting the spoken speech elements into digital signals, an interpreter 30 connected to interface 10 to receive the digital signals and interpret those signals to produce an identification of each spoken speech element, and a comparison and calculating unit 32 for using probabilities, $P_{\alpha\beta}$, produced from data in unit 26, to compare the interpreted speech elements with the data stored in unit 24 in order to identify the word represented by the stored data which corresponds to the spoken speech elements. Units 24 and 26 and interpreter 30 are connected to supply data and signals to unit 32 under control of CPU 22. Unit 32 is further connected to supply data relating to the speech elements of identified words, and interpreter 30 is connected via CPU 22 to supply data relating to interpreted speech elements to unit 26 to allow data updates in unit 26. Unit 32 has an output connected to an output device, such as speech synthesizer 12, which provides the identified word in visible or audible form. Finally, an input panel 36 is connected to CPU 22 to permit the user to perform appropriate manual control actions.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

---

APPENDIX
ALGORITHM FOR THE RHYMING SPELLING CHECKER

Data base creation

---

'create TABLE 2

---

Create name ID table (TABLE 2) by sorting names list table (TABLE 1) into letter group subsets
* pages 8 and 9 *

Spell Check Algorithm

---

'create a two dimension RHYME table for the alphabet as follows,
'placing a zero at the end of each rhyme group 'letter A's rhymes
RHYME(1,1)=1 'A rhymes with A
RHYME(1,2)=8 'H rhymes with A
RHYME(1,3)=10 'J rhymes with A
RHYME(1,4)=11 'K rhymes with A
RHYME(1,5)=0
RHYME(1,6)=0
  etc.
RHYME(1,10)=0
'letter B's rhymes
RHYME(2,1)=2 'B rhymes with B
RHYME(2,2)=3 'C rhymes with B
RHYME(2,3)=4 'D rhymes with B
RHYME(2,4)=5 'E rhymes with B
RHYME(2,5)=7 'G rhymes with B
RHYME(2,6)=16 'P rhymes with B
RHYME(2,7)=20 'T rhymes with B
RHYME(2,8)=22 'V rhymes with B
RHYME(2,9)=26 'Z rhymes with B
RHYME(21,10)=0
'letter C's rhymes
RHYME(3,1)=3 'C rhymes with C
RHYME(3,2)=2 'B rhymes with C
RHYME(3,3)=4 'D rhymes with C
RHYME(3,4)=5 'E rhymes with C
RHYME(3,5)=7 'G rhymes with C
RHYME(3,6)=16 'P rhymes with C
RHYME(3,7)=20 'T rhymes with C
RHYME(3,8)=22 'V rhymes with C
RHYME(3,9)=26 'Z rhymes with C
RHYME(3,10)=0
  etc.

---

'get input string

---

'Read a string of L letters from speech recognized (page 12 line 18)
READ STRING(i) for i=1 to L

---

'process columns

---

'For each column in TABLE 2 (page 13)
FOR n=1 to L
'Read column n of names list table (TABLE 2) into memory -continued

APPENDIX
ALGORITHM FOR THE RHYMING SPELLING CHECKER

```
(page 13)
READ COL (i) = TABLE 2(n,m) for m = 1 to M
'For letters to each side of the column (page 14 line 15)
for j = n-1 to n+1
'Extract the next letter from the string (page 14 line
15).
LET = STRING(j)
'For each rhyming letter in group m (page 14 line 26)
FOR r = 1 to 10
'Get the subset number from the rhyme table (page 14 line
26)
m = RHYME (k,r)
'If end of rhyme group not reached (page 14 line 26)
IF m > 0 THEN
'For each name ID in the rhyming group subset (page 14
line 26)
FOR i = 0 to number in group m
'extract the name number ID (page 15 line 33)
ID = COL (m,i)
'Set weight of 10 if exact match or 6 if rhyme (page 15
line 33)
IF m = RHYME (k,1) THEN
    WEIGHT = 10
ELSE
    WEIGHT = 6
ENDIF
'Initialize the hit count to 1 (page 16 line 2)
HITS = 1
'Increment the hit count if the exact column (page 16
line 4)
IF k = n THEN
    HITS = HITS + 1
ENDIF
'Increment hit count if correct letter sequence (page 15
line 7)
IF (n-k) = previous (n-K) for this name ID THEN
    HITS = HITS + 1
ENDIF
'Calculate score per letter (page 16 line 14)
SCORE = WEIGHT*SCORE/L
'Increment the hit table, TABLE 4 (page 16 line 19)
TABLE4(ID) = TABLE4(ID) + SCORE
NEXT g
ENDIF
NEXT r
NEXT k
NEXT n
```

'search TABLE4 for the three best scores (page 16 line 28)

```
FOR i = 1 to end of TABLE4
    IF TABLE4(i) > BestScore(3) THEN
        BestScore(3) = TABLE4(i, SCORE)
        BestID(3) = TABLE4(i,ID)
        IF BestScore(3) > BestScore(2) then
            SWAP BestScore(3), BestScore(2)
            SWAP BestID(3), BestID(2)
        ENDIF
        IF BestScore(2) > BestScore(1) then
            SWAP BestScore(2), BestScore(1)
            SWAP BestID(2), BestID(1)
        ENDIF
    ENDIF
NEXT i
```

What is claimed:

1. A method for identifying any one of a plurality of words using a programmed digital data processing system, each word having an audible form represented by a sequence of spoken speech elements, with each speech element having a respective position in the sequence, the digital data processing system being connected to means for receiving spoken speech elements of a word and interpreting each received speech element, wherein there is a plurality of possible speech elements, each spoken speech element is a speech element $\alpha$, each interpreted speech elements is a speech element $\beta$, and each spoken speech element a may be interpreted as any one of a plurality of different speech elements $\beta$, one of the speech elements $\beta$ being the same as speech element $\alpha$, said method comprising:

assigning to each of the possible speech elements a respective plurality of probabilities, $P_{\alpha\beta}$, that the speech element will be interpreted as a speech element $\beta$ when a speech element a has been spoken;

storing data representing each word of the plurality of words, the data for each word including identification of each speech element in the word and identification of the respective position of each speech element in the sequence of speech elements representing the word;

in the means for receiving and interpreting, receiving a sequence of speech elements spoken by a person and representing one of the stored words, and interpreting each speech element of the spoken word and the position of each speech element in the sequence of spoken speech elements; and comparing the interpreted speech elements with stored data representing each word of the plurality of words and performing a computation, using the probability, $P_{\alpha\beta}$, associated with each interpreted speech element $\beta$ to identify the word of the plurality of words whose speech elements correspond most closely to interpreted speech elements.

2. A method as defined in claim 1 wherein said step of performing a computation comprises summing the probabilities, $P_{\alpha\beta}$, associated with the interpreted speech elements $\beta$ of the received sequence of speech elements and with the speech elements $\alpha$ in the same positions as the interpreted speech elements for at least a number of the plurality of words, and determining that word of the number of words which is associated with the largest sum.

3. A method as defined in claim 2 comprising the preliminary step of having each of the possible speech elements spoken a given number of times, $N_\alpha$, interpreting each spoken speech element in the means for receiving and interpreting, determining the number of times, $N_{\alpha\beta}$, each spoken speech element $\alpha$ is interpreted as a speech element $\beta$, and for each combination of a respective spoken speech element $\alpha$ and a respective interpreted speech element $\beta$, calculating a probability, $P_{\alpha\beta}$, equal to $N_{\alpha\beta}$ for $\alpha=\beta$, divided by the sum of all $N_{\alpha\beta}$ for the respective interpreted speech element $\beta$ and all spoken speech elements $\alpha$.

4. A method as defined in claim 1 comprising the further step, after said steps of comparing and performing a computation, recalculating the probabilities, $P_{\alpha\beta}$ by increasing, by one unit, each $N_{\alpha\beta}$ associated with each interpreted speech element $\beta$ and the speech element $\alpha$ in the same position as the interpreted speech element in the identified word.

5. A method as defined in claim 1 wherein each speech element is a letter spoken when a word is spelled.

6. A method as defined in claim 1 wherein each speech element is a phoneme pronounced when a word is spoken.

7. A programmed digital data processing system for identifying any one of a plurality of words, each word having an audible form represented by a sequence of spoken speech elements, with each speech element having a respective position in the sequence, wherein there is a plurality of possible speech elements, each spoken speech element is a speech element $\alpha$, each interpreted speech elements ia speech element $\beta$, and each spoken speech element $\alpha$ may be interpreted as any one of a plurality of different speech elements $\beta$, one of the speech elements $\beta$ being the same as speech element $\alpha$, said apparatus comprising:

- first data storage means for storing, for each of the possible speech elements, a respective plurality of probabilities, $P_{\alpha\beta}$, that the speech element will be interpreted as a speech element $\beta$ when a speech element $\alpha$ has been spoken;

- second data storage means for storing data representing each word of the plurality of words, the data for each word including identification of each speech element in the word and identification of the respective position of each speech element in the sequence of speech elements representing the word;

- means for receiving a sequence of speech elements spoken by a person and representing one of the stored words, and for interpreting each speech element of the spoken word and the position of each speech element in the sequence of spoken speech elements; and

- means connected for comparing the interpreted speech elements with stored data representing each word of the plurality of words and performing a computation, using the probability, $P_{\alpha\beta}$, associated with each interpreted speech element $\beta$ to identify the word of the plurality of words whose speech elements correspond most closely to interpreted speech elements.

8. A system as defined in claim 7 wherein said means for comparing and performing a computation comprise means for summing the probabilities, $P_{\alpha\beta}$, associated with the interpreted speech elements $\beta$ of the received sequence of speech elements and with the speech elements $\alpha$ in the same positions as the interpreted speech elements for at least a number of the plurality of words, and means for determining that word of the number of words which is associated with the largest sum.

9. A system as defined in claim 8 further comprising means for performing a preliminary step of having each of the possible speech elements spoken a given number of times, $N_\alpha$, interpreting each spoken speech element in the means for receiving and interpreting, determining the number of times, $N_{\alpha\beta}$, each spoken speech element $\alpha$ is interpreted as a speech element $\beta$, and for each combination of a respective spoken speech element $\alpha$ and a respective interpreted speech element $\beta$, calculating a probability, $P_{\alpha\beta}$, equal to $N_{\alpha\beta}$ for $\alpha=\beta$, divided by the sum of all $N_{\alpha\beta}$ for the respective interpreted speech element $\beta$ and all spoken speech elements $\alpha$.

10. A system as defined in claim 7 further comprising means for recalculating the probabilities, $P_{\alpha\beta}$ by increasing, by one unit, each $N_{\alpha\beta}$ associated with each interpreted speech element $\beta$ and the speech element $\alpha$ in the same position as the interpreted speech element in the identified word.

11. A method for identifying any one of a plurality of words using a programmed digital computing system, each word having an audible form representable by a sequence of speech elements each having a respective position in the sequence, wherein each speech element has at least one identifiable acoustic characteristic and a plurality of the speech elements are substantially identical with respect to the at least one identifiable acoustic characteristic, said method comprising:

- storing, in the digital computing system, a digital representation corresponding to each of the plurality of words;

- receiving a sequence of speech elements spoken by a person and representing the audible form of one of the plurality of words, and storing representations of the received speech elements and their respective positions in the spoken sequence;

- at each position in the spoken sequence, determining each speech element, other than the speech element for which a representation is stored, which is substantially identical to the speech element for which a representation is stored with respect to the at least one identifiable acoustic characteristic,

- comparing combinations of speech elements for which representations are stored and determined speech elements for a word with stored words; and

- identifying the stored word for which the comparison produces the best match with one of the combinations of speech elements.

12. A method as defined in claim 11 further comprising reproducing the stored word which is identified in said identifying step.

* * * * *